April 27, 1948. E. P. DERTHICK 2,440,539
COMBINED PERAMBULATOR AND CRADLE OR THE LIKE
Filed April 12, 1945
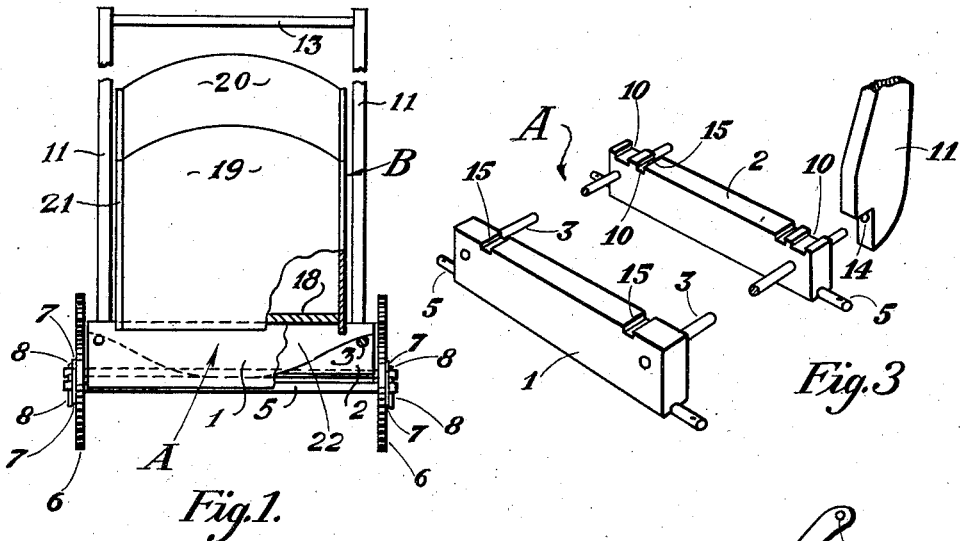
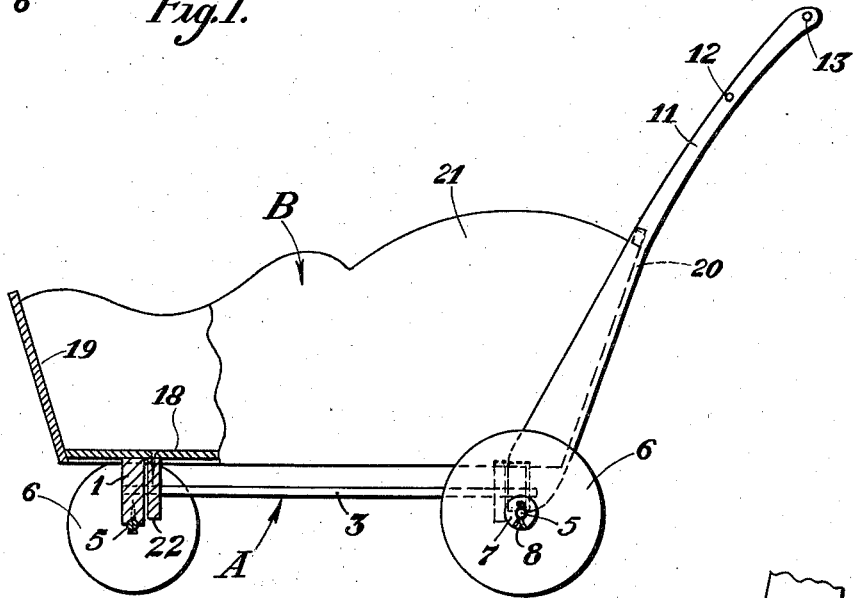
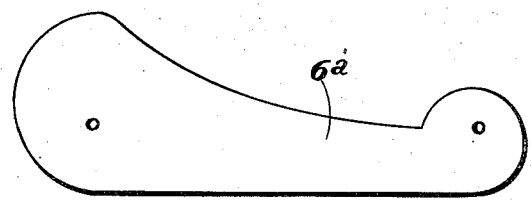
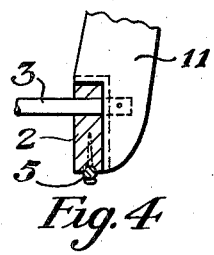
INVENTOR,
Everest P. Derthick
BY Hull & West
ATTYS.

Patented Apr. 27, 1948

2,440,539

UNITED STATES PATENT OFFICE 2,440,539

COMBINED PERAMBULATOR AND CRADLE OR THE LIKE

Everest P. Derthick, Russell, Ohio

Application April 12, 1945, Serial No. 587,912

5 Claims. (Cl. 280—31)

This invention relates to an improved construction for a combination vehicle chassis and removable dual purpose body, the latter of which may serve in its secondary capacity, for example, as a cradle; and the primary object of the invention is to provide a simple and inexpensive construction that is especially convenient of use in that the body may be easily and quickly lifted from the chassis and, when removed, is in readiness for its secondary function without any adjustment of its parts, and which, with equal facility, may be emplaced upon the chassis and, by cooperation with parts thereof, maintain its position against accidental displacement from any reasonable amount of jarring or tilting.

While the invention is intended primarily as a toy, and more particularly as a combined perambulator and cradle for dolls, I wish it to be understood that the invention is not limited to this field. Made in appropriate size the article is adapted to the accommodation of children, although, for such use, it is desirable that a very resilient spring mattress, or spring and mattress, be employed, or that spring suspension means be incorporated, as will be readily understood by those acquainted with such articles.

A more limited object of the invention, therefore, is to provide a combined perambulator and cradle consisting of a chassis, mounted on wheels or runners, which wheels and runners are desirably interchangeable, and provided with a handle or the like for propelling and maneuvering it; and a cradle removably supported by the chassis in such manner that it may be easily lifted therefrom and which, when applied to the chassis, has parts, including rockers, that cooperate with parts of the chassis to properly position the cradle on the chassis and retain it in such position against relative movement or accidental displacement.

When used as a toy, the invention provides a child with several objects of interest and amusement, to wit: a doll's cradle, buggy or sled, and, in the mounting and dismounting of the body or cradle, the child's imagination and dexterity are developed. This is especially true in the substitution of runners for wheels, and vice versa; and this feature, also, renders the invention a year-round article of merchandise and use.

The objects above mentioned, with others hereinafter appearing, are attained in the embodiment of the invention illustrated in the accompanying drawing wherein Fig. 1 represents a front elevation of a combined perambulator and cradle constructed in accordance with the invention, parts being broken away to disclose certain structural details; Fig. 2 is a side elevational view, partly in section; Fig. 3 is a fragmentary perspective view of the chassis; Fig. 4 is a detail of the connection between the handle and chassis frame, and Fig. 5 is a side elevational view of a runner that may be substituted for the wheels shown in Figs. 1 and 2.

The two main units of the combination consist of a chassis, designated generally by A, and a body or cradle, designated generally by B.

The chassis A includes a frame made up of front and rear bolsters 1 and 2, respectively, that are connected together and spaced apart by side members 3, desirably consisting of dowel rods. The front and rear ends of said members are engaged within holes in the bolsters 1 and 2, and are fastened therein by gluing or pinning, or by both such means, the rear ends of said members projecting beyond the bolster 2 for a purpose presently to be described.

Axles 5, which may consist of wooden dowel rods or metal bars, are secured to the under sides of the bolsters 1 and 2, the bolsters desirably being grooved longitudinally to receive the axles. By suitable means, the axles are securely fastened to the bolsters, and they project beyond the ends thereof to provide bearing parts or spindles for the reception of either wheels 6, or runners, one of the latter being shown in Fig. 5 where it is designated $6^a$. Washers 7 are shown as applied to the axles beyond the wheels, and the wheels and washers are held on the axles by suitable means, such as cotter pins 8 that are engaged through holes in the axles.

Channels 10 are made in the top and rear surfaces of the bolster 2 in the vertical planes of the side members 3, and engaged within these channels are the right angularly related sides of the notched lower ends of side members 11 of a handle that is completed by cross bars 12 and 13 that connect the upper ends of said side members together. Holes 14 are made in the lower ends of the side members 11 for the reception of the rear ends of the members 3. The parts when assembled in the manner described, may be secured together by brads, screws, or other fastening means, as well as by gluing, if desired. Formed in the top surfaces of the bolsters 1 and 2, adjacent and inside the vertical planes of the channels 10, are kerfs or notches 15.

The cradle, which, in the present instance, constitutes the body B, consists of a bottom wall 18, front and rear end walls 19 and 20, respectively, and side walls 21, the bottom wall being inset from the horizontal plane of the bottom edges of the other walls a distance substantially equal to or slightly less than the depth of the kerfs or notches 15 in the bolsters 1 and 2. Rockers 22, desirably notched on their upper sides to receive the lower edges of the side walls 21, are rigidly secured to the bottom wall 18 of the body.

When the body or cradle B is properly positioned upon the chassis A, the lower edges of the side walls 21 occupy the kerfs or notches 15, and the rockers contact, or nearly contact, the side members 3 of the chassis. Also, the disposition of the members 3, spaced as they are an appreciable distance outwardly beyond the vertical planes of the side walls of the body and near the horizontal plane of the lower edges of said side walls, tend to prevent the body from rocking with respect to the chassis when the structure is tilted perceptibly to one side or the other. As brought out above, when the body occupies its place upon the chassis, the lower edges of the side walls 21 occupy the kerfs or notches 15 in the tops of the bolsters 1 and 2, said notches or kerfs desirably being sufficiently deep to permit the bottom wall 13 to rest upon the bolsters. The rockers 22 are spaced apart longitudinally of the body so as to be disposed immediately inside the bolsters thereby to prevent the body from shifting longitudinally of the chassis, and when thus positioned on the chassis the rear end of the body is disposed between the side members 11 of the handle, which also prevents the body from tilting with respect to the chassis. It will be observed from Fig. 2 that the rear edges of the side members 11 of the handle are parallel with and slightly to the rear of the transverse plane of the rear end of the body.

Obviously, a utility body or tray, such as would serve as a receptacle for various commodities and packages when shopping, or cabinets, or other structures of a similar nature, may be substituted for the cradle herein described. In any such case, the body would have parts arranged to cooperate with parts of the chassis to hold the body in a given relation to the chassis.

Having thus described my invention, what I claim is:

1. An article of the character described comprising a chassis including bolsters located at its opposite ends, said bolsters having kerfs in their upper sides adjacent the ends thereof, and a two-purpose body adapted to rest on the chassis and being otherwise detached therefrom and including side walls whose lower edges are arranged to engage within said kerfs, and supporting means rigidly secured to the bottom of the body which function to sustain the body at a given elevation above a floor or other supporting surface when the body is not present on the chassis, and which supporting means comprise elements spaced apart longitudinally of the body that cooperate with the bolsters when the body is on the chassis to hold the body against appreciable movement longitudinally of the chassis, said elements and bolsters cooperating in identical fashion at both ends of the article whereby the body may be reversed with respect to the chassis.

2. An article of the character described comprising a chassis including bolsters having kerfs in their upper sides adjacent the ends thereof, and a body consisting of a cradle adapted to rest on the chassis and being otherwise detached therefrom, said cradle including a bottom wall, and side walls that extend below said bottom wall and the lower edges of which are arranged to occupy the aforesaid kerfs, and rockers rigidly fastened to said bottom wall for cooperation with the bolsters to hold the body against appreciable movement longitudinally of the chassis, the side walls and rockers of the cradle cooperating with both bolsters in identical fashion whereby the cradle may be reversed with respect to the chassis.

3. An article of the character described comprising a chassis made up of transversely arranged bolsters and side members connecting said bolsters adjacent the ends of the latter and the top surfaces of which are spaced below the corresponding surfaces of the bolsters, and a body consisting of a cradle adapted to rest on the chassis but otherwise detached therefrom and including rockers fastened to the body against movement with respect thereto and arranged for cooperation with the bolsters to hold the body against appreciable movement longitudinally of the chassis, the ends of the rockers overhanging said side members and being disposed in close proximity thereto to resist by contact therewith tilting of the body with respect to the chassis.

4. An article of the character described comprising a chassis including front and rear bolsters spaced apart longitudinally of the chassis and arranged transversely thereof, said bolsters having aligned holes near their ends and adjacent their top surfaces, rod-like side members having their front ends engaged within the holes of the front bolster and their rear ends projected through and rearwardly beyond the holes of the rear bolster, said rear bolster having in its top and rear surfaces channels in the vertical planes of said side members, a handle including side members notched at their lower ends to fit within said channels of the rear bolster and provided with holes for the reception of the projecting ends of said rod-like side members, and a two-purpose body adapted to rest on the chassis with one of its ends between the side members of the handle and having parts cooperating with the bolsters to hold the body against movement longitudinally of the chassis.

5. An article of the character described comprising a chassis including front and rear bolsters, side members having their opposite ends connected to said bolsters adjacent the ends of the latter, bearing parts attached to and projecting beyond the ends of the bolsters for the reception of supporting wheels or runners, a handle including side members that are connected at their lower ends to the end portions of the rear bolster, said bolsters having notches in their top surfaces in vertical planes immediately inside the vertical planes of the side members of the handle, a cradle adapted to rest on the chassis and having side walls whose lower edges are received by said notches of the bolsters, the cradle being arranged with its rear end between the side members of the handle, and rockers rigidly secured to the bottom of the cradle transversely thereof and spaced apart longitudinally of the cradle to repose between the bolsters with each rocker immediately adjacent a bolster.

EVEREST P. DERTHICK.

REFERENCES CITED

The following references are of record in the file of this patent:

UNITED STATES PATENTS

| Number | Name | Date |
| --- | --- | --- |
| 103,882 | Higgins | June 7, 1870 |
| 234,547 | Doyle | Nov. 16, 1880 |
| 323,390 | Bond et al. | Aug. 4, 1885 |
| 559,445 | Falter | May 5, 1896 |
| 684,875 | Simonson | Oct. 22, 1901 |
| 778,485 | Glascock et al. | Dec. 27, 1904 |
| 1,113,328 | Goggin | Oct. 13, 1914 |
| 1,289,479 | Lafferty | Dec. 31, 1918 |